(12) United States Patent
Abdelli

(10) Patent No.: US 11,119,508 B2
(45) Date of Patent: Sep. 14, 2021

(54) METHOD OF MANAGING AN AUTOPILOT SYSTEM FITTED TO AN AIRCRAFT

(71) Applicant: AIRBUS HELICOPTERS, Marignane (FR)

(72) Inventor: Kamel Abdelli, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 189 days.

(21) Appl. No.: 16/460,047

(22) Filed: Jul. 2, 2019

(65) Prior Publication Data

US 2020/0019188 A1 Jan. 16, 2020

(30) Foreign Application Priority Data

Jul. 16, 2018 (FR) ...................... 1800752

(51) Int. Cl.
| | | |
|---|---|---|
| *G06F 11/07* | (2006.01) | |
| *G05D 1/10* | (2006.01) | |
| *G06F 11/14* | (2006.01) | |

(52) U.S. Cl.
CPC ......... *G05D 1/101* (2013.01); *G06F 11/1438* (2013.01)

(58) Field of Classification Search
CPC ....... G05D 1/101; G05D 1/10; G06F 11/1438
See application file for complete search history.

(56) References Cited

FOREIGN PATENT DOCUMENTS

| | | | | |
|---|---|---|---|---|
| DE | 102007056218 A1 | 5/2009 | | |
| EP | 1785799 A2 * | 5/2007 | ........... | G05D 1/0077 |
| EP | 1785799 A2 | 5/2007 | | |
| EP | 3023304 A1 * | 5/2016 | ........... | B62D 5/0409 |
| EP | 3023304 A1 | 5/2016 | | |
| EP | 3043264 A1 | 7/2016 | | |
| EP | 3104245 A1 * | 12/2016 | ........... | G05D 1/0016 |
| WO | 2009108978 A1 | 9/2009 | | |

OTHER PUBLICATIONS

Hiller, Martin. "Software Fault-Tolerance Techniques from a Real-Time Systems Point of View". Technical Report Department of Computer Engineering. Chalmers University of Technology. Goteborg Sweden. Nov. 1998. 51 pages.
Simon D et al. "A Software Fault Tolerance Experiment For Space Applications". International Symposium on Fault Tolerant Computing. Newcastle Upon Tyne, Jun. 26-28, 1990. Los Alamitos, IEEE Comp. Soc.Press, US. pp. 28-35. 8 pages.
French Search Report for French Application No. FR 1800752, Completed by the French Patent Office, dated May 16, 2019, 8 pages.

* cited by examiner

*Primary Examiner* — Matthew M Kim
*Assistant Examiner* — Kyle Emanuele
(74) *Attorney, Agent, or Firm* — Brooks Kushman P.C.

(57) ABSTRACT

A management method for managing an autopilot system fitted to an aircraft, the management method being adapted to manage at least one error in at least one succession of steps serving to generate at least one autopilot setpoint for the aircraft, the autopilot system comprising at least one computer serving to implement a plurality of successions of steps generating different autopilot setpoints for the aircraft. Such a method comprises an identification step serving to identify the at least one error, a calculation step for determining a total number of occurrences of the at least one error, a stop step serving to stop the at least one succession of steps, a reinitialization step for reinitializing the at least one succession of steps, and a relaunch step for relaunching the at least one succession of steps.

20 Claims, 2 Drawing Sheets

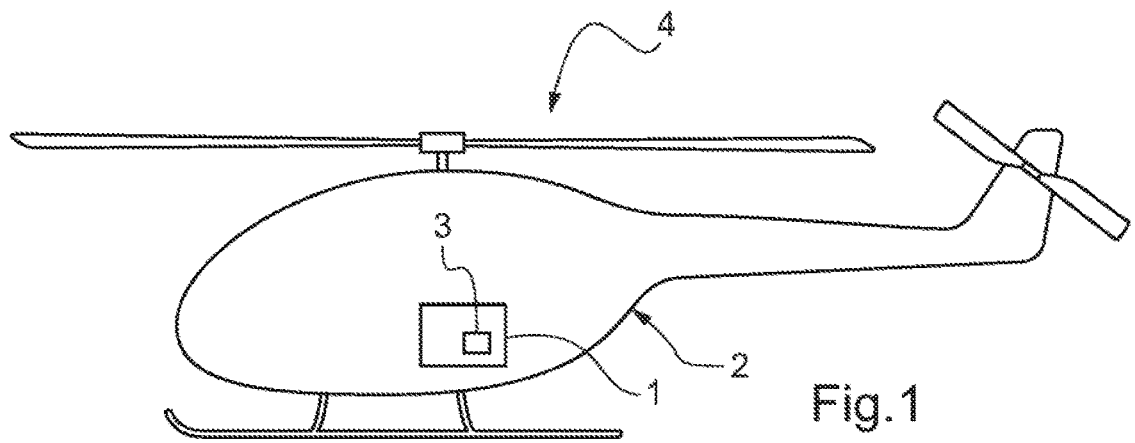
Fig.1
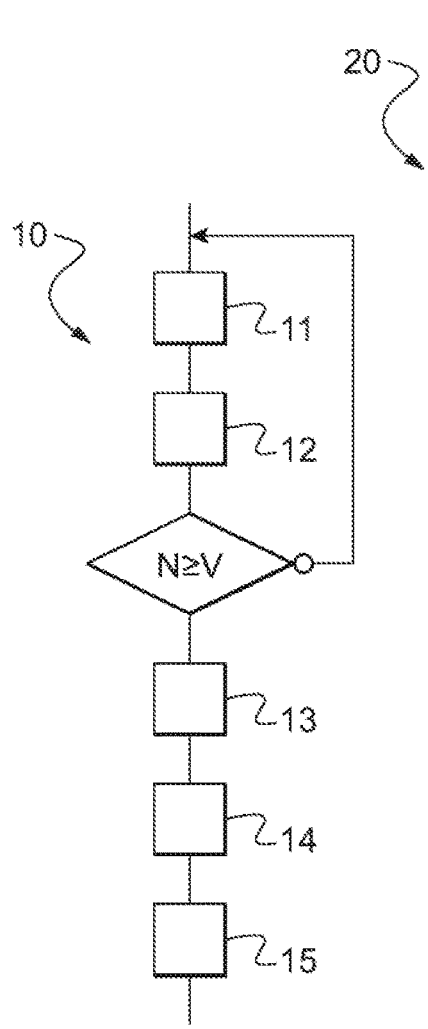
Fig.2
Fig.3

METHOD OF MANAGING AN AUTOPILOT SYSTEM FITTED TO AN AIRCRAFT

CROSS-REFERENCE TO RELATED APPLICATIONS

This application claims priority to French patent application No. FR 1800752 filed on Jul. 16, 2018, the disclosure of which is incorporated in its entirety by reference herein.

BACKGROUND OF THE INVENTION

(1) Field of the Invention

The present invention relates to the field of electronic systems on board aircraft. Such electronic systems may serve in particular to enable an aircraft, such as for example an airplane or a rotorcraft, to be piloted automatically.

More particularly, the invention relates to management methods serving to detect exceptional errors that have an impact on the calculation operations in computer programs serving to output setpoints for controlling the piloting of the aircraft.

Such exceptional errors may then consist in software errors, in which case they are commonly referred to as "bugs".

In addition, such exceptional errors may also be due to an external magnetic field, to electromagnetic waves, or to ionizing particles disturbing the operation of an electronic member such as a microprocessor, a semiconductor type memory, or indeed power transistors. These exceptional errors are generally referred to by the term "single event upset" or by its acronym "SEU".

(2) Description of Related Art

Generally, in order to process such SEU type errors, methods have been developed for comparing two redundant systems, such as described in particular in Document EP 1 785 799. Comparing the output from two redundant systems makes it possible to identify that an error has occurred in a succession of steps of a program, and the redundancy of the systems makes it possible to cause the computer that has generated the error to be taken out of operation.

Nevertheless, under such circumstances, the computer in question is then deactivated completely and/or stopped and no longer perform any other function, which is potentially to the detriment of a service that contributes to flight safety. The pilot of the aircraft is then warned about a failure on one of its computer used in particular for performing the autopilot function.

Other control methods reflecting the technological background are also described in the following documents: EP 3 043 264, EP 3 023 304, DE 10 2007 056 218, WO 2009/108978, and in the publications "A software fault tolerance experiment for space applications" by D. Simon et al., published Jun. 26, 1990, and "Software fault tolerance techniques from a real-time systems point of view" by M. Hiller published Nov. 1, 1998.

In addition, Document EP 3 043 264 describes a control system for aircraft and in particular for a drone. It also describes a guardian process suitable for detecting that an application process is no longer communicating with the guardian process. Such an application process relates to using a peripheral module including a dedicated sensor, e.g. for sensing the attitude or the position of the aircraft.

Document EP 3 043 264 thus discloses a control system on board an aircraft suitable for monitoring data and for identifying errors in that data, which data is generated by peripheral modules and is used solely as input to controlling computer. Such a system is therefore not appropriate for managing at least one error in at least one succession of steps serving to generate at least one setpoint for automatically piloting the aircraft.

In addition, in EP 3 043 264, after an application process has been relaunched several times, if it continues not to function correctly, the guardian process can decide to operate without that process.

Such a guardian process therefore cannot act on the output from a computer or calculations means involving a succession of steps for generating at least one setpoint for automatically piloting the aircraft.

BRIEF SUMMARY OF THE INVENTION

An object of the present invention is thus to propose a method making it possible to avoid the above-mentioned limitations. The method in accordance with the invention serves specifically to avoid taking out of operation a computer that serve to manage automatic piloting of an aircraft. Consequently, such a method makes it possible to avoid having recourse to a redundant system of calculation means in order to be capable of responding to software errors or to exceptional errors of the SEU type, whenever redundancy is not required for other aspects.

The invention thus provides a management method for managing an autopilot system fitted to an aircraft, the management method being adapted to manage at least one error in at least one succession of steps serving to generate at least one autopilot setpoint for the aircraft, the autopilot system comprising at least one computer serving to implement a plurality of successions of steps generating different autopilot setpoints for the aircraft.

According to the invention, such a method is remarkable in that it comprises at least:

an identification step serving to identify the error(s), the identification step serving to identify at least one occurrence of the error(s) over a predetermined period of use of the aircraft;

a calculation step for determining a total number of occurrences of the error(s) over the predetermined period of use of the aircraft;

a stop step serving to stop the succession(s) of steps over a first cycle of steps considered as being faulty when the total number of occurrences of the error(s) is greater than or equal to a predetermined threshold value;

a reinitialization step for reinitializing the succession(s) of steps; and a relaunch step for relaunching the succession(s) of steps from a second cycle of steps considered as being sound, the second cycle of steps being distinct from the first cycle of steps.

In other words, such a method makes it possible to prevent the running of succession(s) of steps impacted by the error(s). Consequently, the physical outputs from the or each computer are temporarily made safe. In this way, the computer remains active, but does not generate any anomalous information.

Furthermore, stopping and then restarting the succession(s) of steps on the second cycle of steps enables the method to implement software sanctions or corrections gradually, while maintaining an optimum level of safety for the aircraft.

Advantageously, said predetermined threshold value may be selected to be greater than or equal to the number 1.

In other words, from the first occurrence of the error(s) over the predetermined period of use of the aircraft, the method serves to stop the succession(s) of steps over a first cycle of steps considered as being faulty, to reinitialize the succession(s) of steps, and to relaunch the succession(s) of steps from a second cycle of steps considered as being sound.

In practice, the method may include a first sanction step for inhibiting a call to at least one first succession of steps of at least one of the first and second cycles of steps.

Such a first sanction step may thus consist in partial and targeted software sanctions so that the main safety functions are not contested, by inhibiting this first succession of steps. By way of example, the first sanction step may give rise to the loss of at least one "active" function for which an undetected failure might be critical for the safety of the aircraft. Passive functions performed by the computer performing the various successions of steps may continue to be maintained in order to keep the flight of the aircraft safe.

In an advantageous implementation of the invention, the first sanction step may operate when the total number of occurrences of the error(s) is greater than or equal to the number 1.

Thereafter, and as above, as soon as the first occurrence of the error(s) over the predetermined period of use of the aircraft, the method serves to perform the above-mentioned first sanction step.

Advantageously, the method may include a second sanction step distinct from the first sanction step, the second sanction step serving to inhibit a call to at least one second succession of steps of at least one of the first and second cycles of steps, the second succession(s) of steps being distinct from the first succession(s) of steps.

Such a second sanction step may consist in other software sanctions seeking to reinitialize the succession(s) of steps in a mode that is simplified or trimmed down so that the succession(s) of steps does/do not perform any calculations. In the same manner, the outputs from the computer may be set to safe values that may sometimes be distinct from the default values that are used when the computer is in a degraded hardware mode, also known as "HALT mode".

Furthermore, the second sanction step may take place when the total number of occurrences of the error(s) is greater than or equal to the number 2, and preferably when the total number of occurrences is greater than or equal to the number 3.

Thus, as from the second or third occurrence of the error(s) over the predetermined period of use of the aircraft, the method serves to perform the above-mentioned second sanction step.

In practice, the method may include a third sanction step distinct from the first and second sanction steps, the third sanction step serving to inhibit a call to at least one individual routine of at least one third succession of steps serving to generate at least one autopilot setpoint for the aircraft. This third sanction step thus serves to eliminate a significant portion of the steps of a computer program formed by the third succession(s) of steps in order to make the autopilot system safe.

Such a third sanction step may also consist in other software sanctions seeking to reinitialize the succession(s) of steps in a mode that is simplified or trimmed down so that the succession(s) of steps does/do not perform any calculations.

In an advantageous implementation of the invention, the third sanction step may take place when the total number of occurrences of the error(s) is greater than or equal to the number 2, and preferably when the total number of occurrences is equal to the number 3.

Thus, and as above, as from the second or third occurrence of the error(s) over the predetermined period of use of the aircraft, the method serves to perform the above-mentioned third sanction step.

BRIEF DESCRIPTION OF THE DRAWINGS

The invention and its advantages appear in greater detail from the context of the following description of examples given by way of illustration and with reference to the accompanying figures, in which:

FIG. 1 is a side view of an aircraft in which a management method in accordance with the invention is implemented;

FIG. 2 is a first flow chart showing a first variant of the management method in accordance with the invention;

FIG. 3 is a second flow chart showing a second variant of the management method in accordance with the invention.

DETAILED DESCRIPTION OF THE INVENTION

Figure 4:
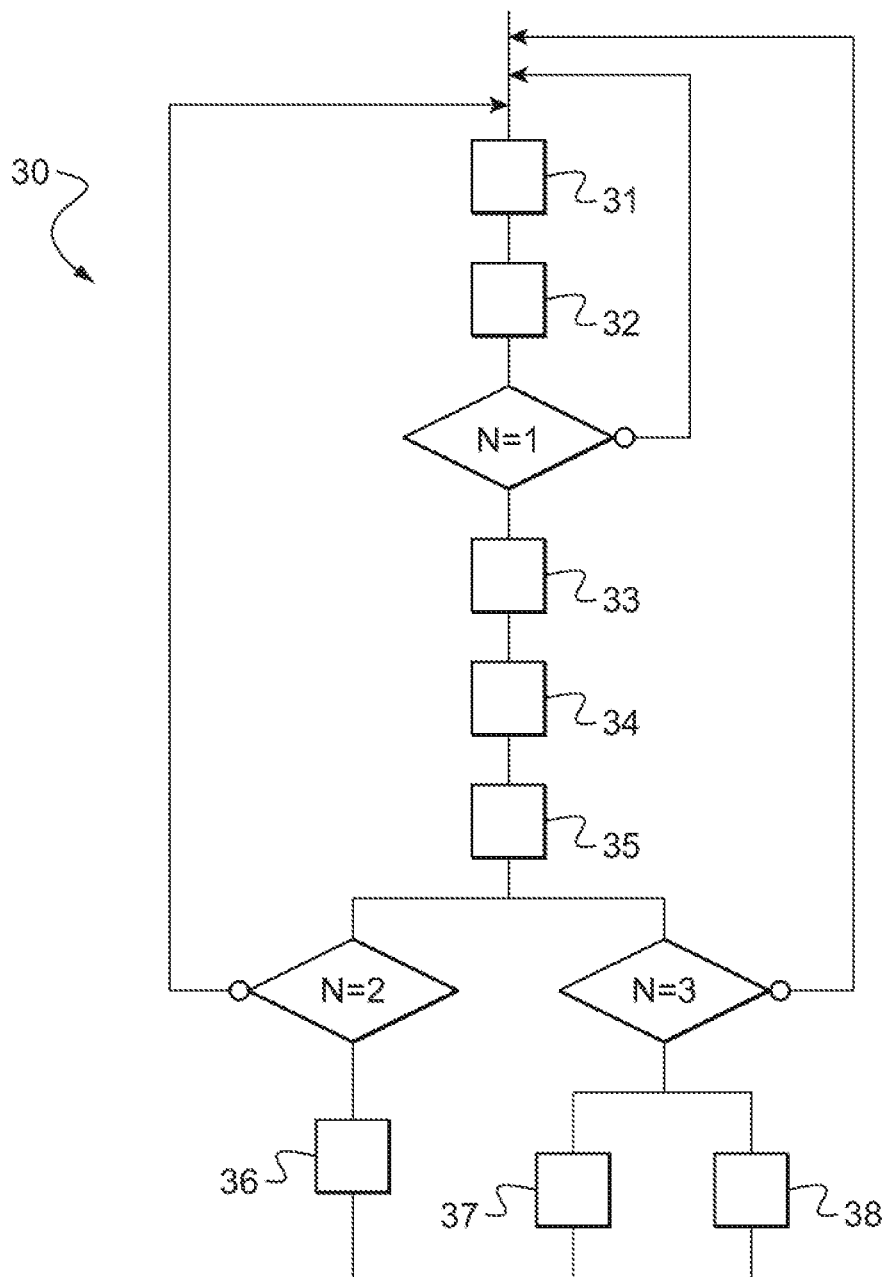
FIG. 4 is a third flow chart showing a third variant of the management method in accordance with the invention.

As mentioned above, the invention relates to methods of managing an autopilot system fitted to an aircraft.

As shown in FIG. 1, an aircraft 2 may include an autopilot system 1 comprising at least one computer 3 serving to generate piloting control setpoints automatically, e.g. for controlling a main rotor 4 of the aircraft 2. By way of example, such an autopilot system 1 is particularly useful and advantageous for reducing, at least temporarily, the workload on a pilot.

In addition, and by way of example such computer 3 may comprise a processor, an integrated circuit, a programmable system, a logic circuit, these examples not limiting the scope to be given to the term "computer" having the function of performing a succession of steps and of repeating such successions of steps over a plurality of cycles.

Thus, such computer 3 is configured to implement a plurality of successions of steps generating different autopilot setpoints for the aircraft 2.

As shown in FIGS. 2 to 4, in a first variant, in a second variant, and in a third variant, such a management method 10, 20, 30 for managing an autopilot system 1 comprises at least an identification step 11, 21, 31 for identifying the error(s) when they occur. In addition, such an identification step 11, 21, 31 serves to identify at least one occurrence of the error(s) over a predetermined period of use of the aircraft 2.

For example, such errors may be of the SEU type and may be generated exceptionally by an external magnetic field, by electromagnetic waves, or by ionizing particles that disturb the operation of an electronic member. Such an electronic member having its operation disturbed may in particular be formed by a microprocessor, a semiconductor type memory, or indeed power transistors.

Thereafter, such a method 10, 20, 30 includes a calculation step 12, 22, 32 for determining a total number N of occurrences of the error(s) over the predetermined period of use of the aircraft 2.

If the total number N of occurrences of the error(s) is greater than or equal to a predetermined threshold value V, then the management method 10, 20, 30 includes a stop step 13, 23, 33 serving to stop the succession(s) of steps over a first cycle of steps that is considered as being faulty.

Under such circumstances, such a management method 10, 20, 30 then includes a reinitializing step 14, 24, 34 for reinitializing the succession(s) of steps.

Finally, the management method 10, 20, 30 includes a relaunch step 15, 25, 35 for relaunching the succession(s) of steps from a second cycle of steps considered as being sound. In addition, such a second cycle of steps is distinct from the first cycle of steps.

Nevertheless, depending on the total number N of occurrences of the error(s), the second variant and the third variant of the management method 20, 30, as shown in FIGS. 3 and 4, may include additional steps providing sanctions that seek to guarantee a maximum level of safety for the aircraft 2.

Thus, by way of example, the value of the predetermined threshold V may be selected to be equal to the number 1. Under such circumstances, as soon as there is a first occurrence of an error, the stop step 23, 33, the reinitialization step 24, 34, and the relaunching step 25, 35 are performed by the management method 20, 30.

Furthermore, when the total number N of occurrences of the error(s) reaches the value 2, the second variant and the third variant of the management method 20, 30 then include a first sanction step 26, 36 for inhibiting a call to at least a first succession of steps of at least one of the first and second cycles of steps.

If the total number N of occurrences of the error(s) reaches the value 3, the second variant and the third variant of the method 20, 30 then include a second sanction step 27, 37 distinct from the first sanction step 26, 36. Such a second sanction step 27, 37 serves to inhibit a call to at least one second succession of steps of at least one of said first and second cycles of steps. Furthermore, this second succession of steps is distinct from the first succession of steps.

In addition, and as shown in FIG. 4, when the total number N of occurrences of the error(s) reaches the value 3, the third variant of the management method 30 may also include a third sanction step 38 distinct from the first and second sanction steps 36 and 37. Such a third sanction step 38 then serves, by way of example, to inhibit a call to at least one individual routine of at least one third succession of steps serving to generate at least one autopilot setpoint for the aircraft 2.

As shown in FIG. 4, such a third sanction step 38 may be performed simultaneously in parallel with the second sanction step 37. Nevertheless, in other variants of the management method (not shown) such a third sanction step 38 may also take the place of the second sanction step 37, or indeed may take place when the total number N of occurrences of the error(s) reaches a predetermined value greater than 3.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A management method for managing an autopilot system fitted to an aircraft, the management method being adapted to manage at least one error in at least one succession of steps serving to generate at least one autopilot setpoint for the aircraft, wherein the method comprising:
implementing by at least one computer of the autopilot system a plurality of successions of steps generating different autopilot setpoints for the aircraft;
an identification step serving to identify the at least one error, the identification step serving to identify at least one occurrence of the at least one error over a predetermined period of use of the aircraft;
a calculation step for determining a total number of occurrences of the at least one error over the predetermined period of use of the aircraft;
a stop step serving to cause the computer to stop the at least one succession of steps over a first cycle of steps considered as being faulty when the total number of occurrences of the at least one error is greater than or equal to a predetermined threshold value;
a reinitialization step to cause the computer to reinitialize the at least one succession of steps; and
a relaunch step to cause the computer to relaunch the at least one succession of steps from a second cycle of steps considered as being sound, the second cycle of steps being distinct from the first cycle of steps.

2. The method according to claim 1, wherein the predetermined threshold value is selected to be greater than or equal to the number 1.

3. The method according to claim 1, wherein the method includes a first sanction step for inhibiting a call to at least one first succession of steps of at least one of the first and second cycles of steps.

4. The method according to claim 3, wherein the first sanction step operates when the total number of occurrences of the at least one error is greater than or equal to the number 1.

5. The method according to claim 1, wherein the method includes a second sanction step distinct from the first sanction step, the second sanction step serving to inhibit a call to at least one second succession of steps of at least one of the first and second cycles of steps, the at least one second succession of steps being distinct from the at least one first succession of steps.

6. The method according to claim 5, wherein the second sanction step takes place when the total number of occurrences of the at least one error is greater than or equal to the number 2.

7. The method according to claim 1, wherein the method includes a third sanction step distinct from the first and second sanction steps, the third sanction step serving to inhibit a call to at least one individual routine of at least one third succession of steps serving to generate at least one autopilot setpoint for the aircraft.

8. The method according to claim 7, wherein the third sanction step takes place when the total number of occurrences of the at least one error is greater than or equal to the number 2.

9. A management method for managing an autopilot system fitted to an aircraft, the management method being adapted to manage at least one error in at least one succession of steps serving to generate at least one autopilot setpoint for the aircraft, the method comprising:
implementing by a computer of the autopilot system a plurality of successions of steps generating different autopilot setpoints for the aircraft;

an identification step to identify the at least one error, the identification step identifying at least one occurrence of the at least one error over a predetermined period of use of the aircraft;

a calculation step to determine a total number of occurrences of the at least one error over the predetermined period of use of the aircraft;

a stop step to cause the computer to stop the at least one succession of steps over a first cycle of steps considered faulty when the total number of occurrences of the at least one error is greater than or equal to a predetermined threshold value;

a reinitialization step to cause the computer to reinitialize the at least one succession of steps; and a relaunch step to cause the computer to relaunch the at least one succession of steps from a second cycle of steps considered sound, the second cycle of steps being distinct from the first cycle of steps.

10. The method according to claim 9, wherein the predetermined threshold value is greater than or equal to the number 1.

11. The method according to claim 9, wherein the method includes a first sanction step to inhibit a call to at least one first succession of steps of at least one of the first and second cycles of steps.

12. The method according to claim 11, wherein the first sanction step operates when the total number of occurrences of the at least one error is greater than or equal to the number 1.

13. The method according to claim 9, wherein the method includes a second sanction step distinct from the first sanction step, the second sanction step serving to inhibit a call to at least one second succession of steps of at least one of the first and second cycles of steps, the at least one second succession of steps being distinct from the at least one first succession of steps.

14. The method according to claim 13, wherein the second sanction step takes place when the total number of occurrences of the at least one error is greater than or equal to the number 2.

15. The method according to claim 9, wherein the method includes a third sanction step distinct from the first and second sanction steps, the third sanction step serving to inhibit a call to at least one individual routine of at least one third succession of steps serving to generate at least one autopilot setpoint for the aircraft.

16. The method according to claim 15, wherein the third sanction step takes place when the total number of occurrences of the at least one error is greater than or equal to the number 2.

17. A management method for managing an aircraft autopilot system, the management method adapted to manage an error in at least one succession of steps serving to generate at least one autopilot setpoint for the aircraft, the autopilot system comprising a computer serving to implement a plurality of successions of steps generating different autopilot setpoints for the aircraft, the method comprising:

identifying at least one occurrence of at least one error over a predetermined period of use of the aircraft;

determining a total number of occurrences of the at least one error over the predetermined period of use of the aircraft;

the computer causing stopping of the at least one succession of steps over a first cycle of steps considered faulty when the total number of occurrences of the at least one error is greater than or equal to a predetermined threshold value;

the computer causing reinitializing of the at least one succession of steps; and the computer causing relaunching the at least one succession of steps from a second cycle of steps considered sound, the second cycle of steps distinct from the first cycle of steps.

18. The method according to claim 17, wherein the predetermined threshold value is greater than or equal to the number 1.

19. The method according to claim 17, wherein the method includes a first sanction step for inhibiting a call to at least one first succession of steps of at least one of the first and second cycles of steps, wherein the first sanction step operates when the total number of occurrences of the at least one error is greater than or equal to the number 1.

20. The method according to claim 19, wherein the method includes a second sanction step distinct from the first sanction step, the second sanction step serving to inhibit a call to at least one second succession of steps of at least one of the first and second cycles of steps, the at least one second succession of steps being distinct from the at least one first succession of steps, wherein the second sanction step takes place when the total number of occurrences of the at least one error is greater than or equal to the number 3, wherein the method includes a third sanction step distinct from the first and second sanction steps, the third sanction step serving to inhibit a call to at least one individual routine of at least one third succession of steps serving to generate at least one autopilot setpoint for the aircraft, wherein the third sanction step takes place when the total number of occurrences of the at least one error is greater than or equal to the number 3.

* * * * *